United States Patent
Edmundson et al.

(10) Patent No.: US 12,418,039 B2
(45) Date of Patent: Sep. 16, 2025

(54) MEMBRANE ELECTRODE ASSEMBLY MANUFACTURING PROCESS

(71) Applicant: W. L. Gore & Associates, Inc., Newark, DE (US)

(72) Inventors: Mark Edmundson, Rancho Palos Verdes, CA (US); F. Colin Busby, Newark, DE (US)

(73) Assignee: W. L. Gore & Associates, Inc.

( * ) Notice: Subject to any disclaimer, the term of this patent is extended or adjusted under 35 U.S.C. 154(b) by 929 days.

(21) Appl. No.: 17/567,621

(22) Filed: Jan. 3, 2022

(65) Prior Publication Data
US 2022/0149408 A1 May 12, 2022

Related U.S. Application Data (63) Continuation of application No. 16/092,440, filed as application No. PCT/US2017/006825 on Dec. 22, 2017, now Pat. No. 11,251,453.
(Continued)

(51) Int. Cl.
*H01M 8/1004* (2016.01)
*H01M 4/88* (2006.01)
(Continued)

(52) U.S. Cl.
CPC ....... *H01M 8/1004* (2013.01); *H01M 4/8807* (2013.01); *H01M 4/881* (2013.01);
(Continued)

(58) Field of Classification Search
None
See application file for complete search history.

(56) References Cited

U.S. PATENT DOCUMENTS

| | | |
|---|---|---|
| 6,844,286 B2 | 1/2005 | Koehler et al. |
| 7,754,369 B2 | 7/2010 | Starz et al. |

(Continued)

FOREIGN PATENT DOCUMENTS

| | | |
|---|---|---|
| JP | 2000-133285 A | 5/2000 |
| JP | 4545403 B2 | 9/2010 |
| WO | 2016/130529 A1 | 8/2016 |

OTHER PUBLICATIONS

International Preliminary Report on Patentability received for PCT Patent Application No. PCT/US17/68252, mailed on Jul. 2, 2020, 8 pages.
(Continued)

*Primary Examiner* — Lucas J. O'Donnell
(74) *Attorney, Agent, or Firm* — Faegre Drinker Biddle & Reath (57) ABSTRACT

Methods and compositions for making fuel cell components are described. In one embodiment, the method comprises providing a substrate, and forming or adhering an electrode on the substrate, wherein the forming includes depositing an aqueous mixture comprising water, a water-insoluble component, a catalyst, and an ionomer. The water-insoluble component comprises a water-insoluble alcohol, a water-insoluble carboxylic acid, or a combination thereof. The use of such water-insoluble components results in a stable liquid medium with reduced reticulation upon drying, reduced dissolution of the substrate, and reduced penetration of the pores of the substrate.

48 Claims, 2 Drawing Sheets

Related U.S. Application Data (60) Provisional application No. 62/438,877, filed on Dec. 23, 2016.

(51) Int. Cl.
*H01M 4/90* (2006.01)
*H01M 4/92* (2006.01)
*H01M 8/10* (2016.01)

(52) U.S. Cl.
CPC ....... *H01M 4/8814* (2013.01); *H01M 4/8828* (2013.01); *H01M 4/9083* (2013.01); *H01M 4/926* (2013.01); *H01M 2008/1095* (2013.01)

(56) References Cited

U.S. PATENT DOCUMENTS

| | | | |
|---|---|---|---|
| 11,251,453 B2* | 2/2022 | Edmundson | H01M 4/881 |
| 12,155,102 B2* | 11/2024 | Edmundson | H01M 4/8828 |
| 2004/0023105 A1* | 2/2004 | Hohenthanner | C25B 9/23 |
| | | | 429/480 |
| 2005/0067345 A1 | 3/2005 | Prugh et al. | |
| 2006/0110631 A1 | 5/2006 | Olmeijer et al. | |
| 2006/0229194 A1 | 10/2006 | Uchida et al. | |
| 2011/0166009 A1 | 7/2011 | Behl et al. | |
| 2013/0040222 A1 | 2/2013 | Kim et al. | |
| 2013/0202986 A1 | 8/2013 | Moose et al. | |
| 2014/0261983 A1 | 9/2014 | Houghtaling | |
| 2016/0233532 A1 | 8/2016 | Freese et al. | |
| 2019/0288318 A1 | 9/2019 | Edmundson et al. | |
| 2022/0149407 A1 | 5/2022 | Edmundson et al. | |

OTHER PUBLICATIONS

International Search Report and Written Opinion from International Application No. PCT/US2017/068252 dated Jul. 10, 2018.
International Search Report and Written Opinion received for PCT Patent Application No. PCT/US17/68252, mailed on Jul. 10, 2018, 11 pages.
Kim, Kihyun, et al., "Poly(arylene ether sulfone) based semi-interpenetrating polymer network membranes containing cross-linked poly (vinyl phosphonic acid) chains for fuel cell applications at high temperature and low humidity conditions." Journal of Power Sources 293 (2015): 539-547.
Uchida, Makoto, et al. "New preparation method for polymer-electrolyte fuel cells." Journal of the Electrochemical Society 142.2 (1995): 463.
Wang, Wentao, et al. "Fabrication of catalyst coated membrane with screen printing method in a proton exchange membrane fuel cell." international journal of hydrogen energy 40.13 (2015): 4649-4658.
Hurter, S., et al. "1-hexanol based catalyst inks for catalyst layer preparation for a DMFC." Journal of fuel cell science and technology 10.6 (2013): 061008.
Ngo, Trung True, T. Leon Yu, and Hsiu-Li Lin. "Nafion-based membrane electrode assemblies prepared from catalyst inks containing alcohol/water solvent mixtures." Journal of power sources 238 (2013): 1-10.

* cited by examiner

MEMBRANE ELECTRODE ASSEMBLY MANUFACTURING PROCESS

CROSS-REFERENCE TO RELATED APPLICATION

This application is a continuation of U.S. application Ser. No. 16/092,440, filed Oct. 9, 2018, which is a U.S. National Stage of International Application No. PCT/US2017/068252, filed on Dec. 22, 2017, and claims priority from U.S. Provisional App. No. 62/438,877, entitled "MEMBRANE ELECTRODE ASSEMBLY MANUFACTURING PROCESS," filed Dec. 23, 2016, the disclosure of which are incorporated herein by reference in its entirety.

GOVERNMENT INTEREST

This invention was made under a contract with an agency of the U. S. Government. The name of the U.S. Government agency is Department of Energy (Golden Field Office), and the U.S. Government contract number is DE-FC36-08G018052.

FIELD OF THE INVENTION

The present disclosure relates to membrane electrode assemblies for polymer electrolyte membrane (PEM) fuel cells, and in particular, to a method of making a component for a membrane electrode assembly that includes depositing an aqueous mixture comprising water, a water-insoluble component, a catalyst, and an ionomer on a substrate to form an electrode or a microporous structure.

BACKGROUND OF THE INVENTION

A membrane electrode assembly (MEA) is a core component of a polymer electrolyte membrane (PEM) Fuel Cell. It is comprised of a PEM with an anode electrode on one side and a cathode electrode on the other side. The final MEA may be a three-layer assembly, including an anode layer, a PEM layer and a cathode layer. Additionally, the MEA may also include Gas Diffusion Layers (GDLs), which are typically comprised of carbon paper, and are attached to the outer surface of each electrode. If GDLs are attached to both electrodes then the final MEA is considered a five-layer assembly including a first layer of GDL, an anode layer, a PEM layer, a cathode layer and another layer of GDL. Typically the PEM and GDLs have sufficient mechanical integrity to be self-supporting webs, but the electrodes do not. Therefore each electrode is typically formed on a substrate which may be the PEM, a GDL, or a release layer. The layers of the MEA are then bonded together with heat and/or pressure as needed to form a composite sheet.

There are various established techniques for forming the electrodes on a substrate and/or bonding the electrodes to other layers of the MEA; however, each technique has problems. Traditionally, the electrodes were coated onto a release layer and then laminated to a PEM. However, this method is inefficient and costly. More recently, this process has been streamlined by coating the electrodes directly onto the PEM. However, coating the electrode directly on the PEM can result in distorting or dissolving of the PEM, which can be particularly problematic when a thinner PEM is used. Alternatively, the electrodes can be coated directly onto a porous substrate such as a GDL. However, this method can result in imbibing the ionomer and the catalyst into the pores of the substrate, altering the properties of the substrate and/or rendering a portion of the catalyst ineffective. Accordingly, the need exists for improved methods of manufacturing components for membrane electrode assemblies in an efficient and cost effective manner.

SUMMARY OF THE INVENTION

In one embodiment, the present disclosure relates to a method of making a fuel cell component, the method comprising providing a substrate; and forming an electrode on the substrate, wherein the forming includes depositing an aqueous mixture comprising water, a water-insoluble component, a catalyst, and an ionomer, wherein the water-insoluble component comprises a water-insoluble alcohol, water-insoluble carboxylic acid or a combination thereof. In some embodiments, the water-insoluble component comprises a $C_5$-$C_{10}$ alcohol, a $C_5$-$C_{10}$ carboxylic acid, or a combination thereof. In some embodiments, the substrate comprises a porous layer, a non-porous layer or a combination thereof.

In another embodiment, the disclosure relates to a method of making a fuel cell component, the method comprising forming a first electrode on a polymer electrolyte membrane, wherein the forming comprises depositing an aqueous mixture on the polymer electrolyte membrane, wherein the aqueous mixture comprises water, a water-insoluble component, a catalyst, and an ionomer, wherein the water-insoluble component comprises a water-insoluble alcohol or water-insoluble carboxylic acid; and forming a second electrode on the polymer electrolyte membrane.

In another embodiment, the disclosure relates to a method of making a fuel cell component, the method comprising forming a first electrode on a gas diffusion layer, wherein the forming comprises depositing an aqueous mixture on the gas diffusion layer, and the aqueous mixture comprises water, a water-insoluble component, a catalyst, and an ionomer, wherein the water-insoluble component comprises a water-insoluble alcohol, a water-insoluble carboxylic acid or a combination thereof; forming or adhering a polymer electrolyte membrane on the first electrode; and forming a second electrode on the polymer electrolyte membrane. A second gas diffusion layer may then be formed on or adhered to the second electrode.

In another embodiment, the disclosure relates to an aqueous mixture composition for forming a fuel cell electrode, which composition may be used in any of the above methods, the composition comprising a) water; b) a water-insoluble component comprising a water-insoluble alcohol, a water-insoluble carboxylic acid or a combination thereof; c) a catalyst; and d) an ionomer.

In the embodiments described herein, the water-insoluble component optionally comprises a $C_5$-$C_{10}$ alcohol, such as, for example, 1-pentanol, 1-hexanol, 1-heptanol, 1-octanol, 2-ethyl-1-hexanol, 1-nonanol, 1-decanol, or a combination thereof. In another aspect, the water-insoluble component comprises a $C_5$-$C_{10}$ carboxylic acid, such as, for example, n-pentanoic acid, n-hexanoic acid, n-heptanoic acid, n-octanoic acid, n-nonanoic acid, n-decanoic acid or a combination thereof.

The component concentration of the aqueous mixture may vary, depending on numerous factors discussed herein. The water is optionally present in the aqueous mixture in an amount greater than 35 wt. %, optionally greater than 50 wt. %, optionally greater than 70 wt. %, optionally greater than 80 wt. %, or optionally greater than 90 wt. %, based on a total weight of the ionomer and vehicle in the aqueous mixture. As used herein, the term "vehicle" refers to the liquid portion of the aqueous mixture, including water, organic solvents (if any), and dissolved solutes (if any). The catalyst is optionally present in the aqueous mixture in an amount less than 90 wt. %, optionally less than 35 wt. %, optionally less than 9 wt. %, based on a total weight of the aqueous mixture. The catalyst employed optionally comprises a noble metal, a transition metal, or an alloy thereof, and may be supported (optionally on a carbon support) or unsupported. The water-insoluble component optionally is present in the aqueous mixture in an amount less than 20 wt. %, optionally less than 15 wt. %, optionally less than 10 wt. %, optionally less than 8 wt. %, optionally less than 6 wt. %, or optionally less than 4 wt. %, based on a total weight of the ionomer and vehicle in the aqueous mixture. The ionomer is optionally present in the aqueous mixture in an amount less than 50 wt. %, optionally in an amount less than 35 wt. %, optionally in an amount less than 8 wt. %, or optionally in an amount less than 0.5 wt. %, based on a total weight of the ionomer and vehicle in the aqueous mixture.

In terms of ranges, in some embodiments, the water is present in the aqueous mixture in an amount from 35 wt. % to 99 wt. %, based on a total weight of the ionomer and vehicle in the aqueous mixture. The catalyst may be present in the aqueous mixture in an amount from 1 wt. % to 42 wt. %, based on a total weight of the aqueous mixture. The water-insoluble alcohol may be present in the aqueous mixture in an amount from 0.5 wt. % to 20 wt. %, based on a total weight of the ionomer and vehicle in the aqueous mixture. And the ionomer may be present in the aqueous mixture in an amount from 0.5 wt. % to 50 wt. %, based on a total weight of the ionomer and vehicle in the aqueous mixture.

The aqueous mixture optionally further comprises a water-soluble compound, optionally a water-soluble alcohol. Where the optional water-soluble compound comprises a water-soluble alcohol, the water-soluble alcohol optionally comprises isopropanol, tert-butanol or a glycol ether. If included in the mixture, the glycol ether optionally comprises dipropylene glycol (DPG) or propylene glycol methyl ether (PGME). The optional water-soluble compound may be present in the aqueous mixture in an amount less than 50 wt. %, optionally in an amount less than 25 wt. %, optionally in an amount less than 9 wt. %, or optionally in an amount less than 4 wt. %, based on a total weight of the ionomer and vehicle in the aqueous mixture. According to various embodiments, the aqueous mixture may contain organic compounds.

The substrate employed may vary widely, and in various embodiments may comprise a porous layer, wherein the porous layer optionally is air permeable or comprises a gas diffusion layer, or wherein the porous layer optionally comprises a porous release layer. In the latter aspect, the porous release layer may comprise an expanded polymer, such as, for example, expanded polytetrafluoroethylene (ePTFE). In other embodiments, the substrate comprises a non-porous layer, optionally a non-porous release layer. The non-porous layer may comprises a polymer electrolyte membrane (PEM), which may comprise a proton-conducting polymer. The polymer electrolyte membrane optionally comprises a porous microstructure and an ionomer impregnated in the porous microstructure. The porous microstructure may comprise a perfluorinated porous polymeric material, e.g., an ePTFE membrane. In another aspect, the porous microstructure comprises a hydrocarbon material, optionally polyethylene, polypropylene, or polystyrene. In some aspects, the substrate comprises another electrode on a side of the substrate opposite to the electrode that is being formed. In this aspect, the step of forming the electrode optionally further comprises drying the aqueous mixture. In another aspect, the method optionally further comprises forming another electrode on a side of the substrate opposite the electrode that is initially formed, and the forming of the another electrode optionally comprises depositing the aqueous mixture on the substrate, and optionally drying the aqueous mixture. In another aspect, the method optionally further comprises laminating the electrode to a polymer electrolyte membrane. The method optionally further comprises forming or adhering a polymer electrolyte membrane on the electrode. In another aspect, the method optionally further comprises laminating a porous layer, a non-porous layer or a combination thereof to at least one of the electrode and the substrate.

BRIEF DESCRIPTION OF THE DRAWINGS

The present invention will be better understood in view of the following non-limiting figures, in which.

DETAILED DESCRIPTION OF THE INVENTION

I. Introduction

A membrane electrode assembly (MEA) is comprised of a polymer electrolyte membrane (PEM) with an anode electrode on one side and a cathode electrode on the other side. The final MEA may be a three-layer assembly, having the layers placed adjacent to each other as Anode-PEM-Cathode in the final MEA. Additionally, the MEA may also include Gas Diffusion Layers (GDLs) attached to the outer surface of each electrode. If GDLs are attached to both electrodes then the final MEA is considered a five-layer assembly, having the layers placed adjacent to each other as GDL-Anode-PEM-Cathode-GDL in the final MEA. According to various embodiments, the layers may be formed (e.g. manufactured) in any order, for example the PEM may be formed before the GDLs, the anode, or the cathode.

Typically, an MEA is made by first preparing an ink comprising ionomer, catalyst particles, and a solvent or vehicle. The ink is then coated and substantially dried on a substrate. The substrate can be the PEM, a GDL, or a release layer. These substrates might be typically rough, porous, hydrophobic, dimensionally unstable, and/or easily dissolved or disrupted, and are therefore difficult to coat.

One processing requirement is that the ink has a sufficiently low contact angle with the substrate to avoid defects caused by de-wetting. This can be achieved by lowering the surface tension of the ink. Typically, the ionomer does not significantly lower the surface tension of the ink (and therefore ionomer is not considered a surfactant). However, the surface tension can be lowered through the addition of high concentrations, e.g., more than about 30 wt %, of water-soluble alcohols, such as ethyl alcohol, methyl alcohol, and isopropyl alcohol (IPA). However, high concentrations of water-soluble alcohols can create other processing problems. For example, if the substrate is a PEM, its ionomer may be partially dissolved or its mechanical integrity may be otherwise disrupted, causing higher gas crossover, which lowers fuel efficiency, and increasing the risk of electrical short-circuits (which reduces durability). Dissolution of the ionomer can also result in ionomer imbibing the electrode, which can decrease power generation through mass transport limitations known as "flooding," and can decrease durability through reduced voltage cycling durability. Additionally, the ionomer membrane sometimes contains an additive such as cerium to prevent degradation by free radicals. For this additive to function properly the thickness of the ionomer membrane should be carefully controlled. In particular, the ionomer membrane thickness should not be changed by being partially dissolved when the electrode is coated.

Alternatively, if the substrate is a porous layer such as a GDL, inks with low surface tension tend to penetrate the pores of the substrate, resulting in an alteration of its water management properties (due to ionomer contamination), or in depositing catalyst too far from the ionomer membrane to be fully utilized. In order to minimize the afore-mentioned problems, the water-soluble alcohol content can be minimized, but this results in reticulation of the ink upon drying, resulting in non-uniformities such as thickness variations and holes in the electrodes.

Nonetheless, it has now been discovered that the ink for forming the electrode can be improved by making the liquid phase substantially aqueous, and including a "water-insoluble component," defined herein as a $C_{5+}$ alcohol, a $C_{5+}$ carboxylic acid, or a combination thereof. As used herein, "$C_{5+}$" refers to compounds having five or more carbon atoms. In some embodiments, the water-insoluble component comprises a $C_5$-$C_{10}$ alcohol, a $C_5$-$C_{10}$ carboxylic acid, or a combination thereof. Thus, in some embodiments, the water-insoluble component comprises a water-insoluble alcohol, such as, for example, 1-pentanol, 1-hexanol, 1-heptanol, 1-octanol, 2-ethyl-1-hexanol, 1-nonanol, 1-decanol, or a combination thereof. In some embodiments, the water-insoluble component comprises a water-insoluble carboxylic acid, such as, for example, n-pentanoic acid, n-hexanoic acid, n-heptanoic acid, n-octanoic acid, n-nonanoic acid, n-decanoic acid or a combination thereof. As used here, the term "a combination thereof" refers to any combination of two or more species in the immediately preceding list. Branched alcohols and/or branched carboxylic acids are also contemplated, as are various combinations of $C_{5+}$ alcohols and $C_{5+}$ carboxylic acids.

Surprisingly, these aqueous mixtures produce low contact angles when the aqueous mixture is spread on the substrate, such that the aqueous mixtures satisfactorily wet the substrates even with little or no use of water-soluble alcohols and show low reticulation during the drying process. "Low reticulation" as used herein is intended to mean any film that contracts less than 15% in width, less than 15% in length, and for which the final area of the film comprised less than 15% de-wetting defects. Reticulation was assessed by pipetting 60-80 microliters of the aqueous mixture onto the substrate, then using a pipet bulb to spread the aqueous mixture on the substrate to form a film with a length of 4-6 cm and a width of 7-15 mm, then drying the film in less than 1 minute with a heat gun while visually inspecting. Without being limited by theory, it is speculated that the ionomer, which as described above is not considered a surfactant, surprisingly emulsifies the water-insoluble component. Importantly and also surprisingly, these aqueous mixtures allow monolithic film formation on top of porous and/or hydrophobic substrates such as gas diffusion layers without significant penetration of the porous structure. Accordingly, at least a portion of the pores of the porous substrate remains unfilled with the aqueous mixture during the depositing process (e.g. when the aqueous mixture is being deposited on the porous substrate). The resulting aqueous mixtures have adequate stability to permit coating by manufacturing processes described herein The aqueous mixture according to various embodiments may include an emulsion or a suspension such that the aqueous mixture maintains a single phase during the depositing process (i.e., the aqueous mixture does not separate into an "oil-rich layer" and "water-rich layer" too rapidly to prevent coating and drying). According to various embodiments, the aqueous mixture remains homogenous where the components (e.g. oil, water, etc.) are uniformly distributed during at least the depositing process.

In one embodiment, the disclosure is directed to a method of making a component for a membrane electrode assembly, the method comprising providing a substrate and forming an electrode on the substrate. The forming includes depositing an aqueous mixture comprising water, a water-insoluble component, a catalyst, and an ionomer on the substrate. The term depositing is intended to include but not be limited to various means of applying liquid coatings, such as slot die coating, slide die coating, curtain coating, gravure coating, reverse roll coating, spray coating, knife-over-roll coating, and dip coating. The term liquid is intended to include electrode ink. The substrate may comprise a porous layer, a non-porous layer, or combinations thereof. In some embodiments, the porous layer is air-permeable, or comprises a gas diffusion layer or a porous release layer such as an expanded polymer (e.g., expanded polytetrafluoroethylene (ePTFE)). In some embodiments, the porous layer may have hydrophobic properties to prevent the water from spontaneously wetting in. In other embodiments, the non-porous layer comprises a non-porous release layer or a polymer electrolyte membrane (PEM). The PEM may comprise an ionomer such as a proton-conducting polymer, or a porous microstructure and an ionomer impregnated in the porous microstructure. The porous microstructure may comprise a perfluorinated porous polymeric material or a hydrocarbon material.

As indicated, the aqueous mixture comprises water, a water-insoluble component, a catalyst, and an ionomer such as perfluorosulfonic (PFSA). The aqueous mixture may comprise greater than about 35 wt. %, greater than about 50 wt. %, greater than about 70 wt. %, greater than about 80 wt. %, or greater than about 90 wt. % water, based on a total weight of the ionomer and vehicle in the aqueous mixture. The catalyst may comprise noble metals, transition metals, or alloys thereof, and may be present in the aqueous mixture in an amount less than about 90 wt %, less than about 35 wt %, or less than about 9 wt. %, based on a total weight of the aqueous mixture. In one embodiment, the water-insoluble component is present in the aqueous mixture in an amount less than about 20 wt. %, less than about 15 wt. %, less than about 10 wt. %, less than about 8 wt. %, less than about 6 wt. %, or less than about 4 wt. %, based on a total weight of the ionomer and vehicle in the aqueous mixture. The ionomer may comprise a PFSA, and may be present in the aqueous mixture in an amount less than about 50 wt %, less than about 35 wt %, less than about 8 wt. %, or less than about 0.5 wt. %, based on a total weight of the ionomer and vehicle in the aqueous mixture. It will be appreciated that the specific concentrations of the components in the aqueous mixture that are required to achieve the benefits herein described may vary widely within the ranges listed, depending, for example, on the substrate on which the aqueous mixture is to be deposited, since the wettability of the substrates will vary depending, for example, on porosity, pore size, and surface energy of the substrates. The desired catalyst loading in the aqueous mixture and on the substrate will also impact the desired component concentrations. As a result, the above concentrations are provided as guidelines, understanding that some degree of optimization, well within the purview of those of ordinary skill in the art, may be necessary depending on the chosen substrate and desired catalyst loading.

In other embodiments, the aqueous mixture further comprises a water-soluble compound. If present, the water-soluble compound may comprise a water-soluble alcohol, a glycol ether, or a combination thereof, and may be present in the aqueous mixture in an amount less than about 50 wt %, less than about 25 wt %, less than about 9 wt %, or less than about 4 wt %, based on a total weight of the ionomer and vehicle in the aqueous mixture. The terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, or 10 percent.

Advantageously, by utilizing the modified aqueous mixture disclosed herein, the component of the MEA is able to be formed in a stable manner that prevents or minimizes (i) dissolution of the substrate, (ii) penetration of the pores of the substrate, (iii) a deposition of catalyst too far from the PEM to be fully utilized, and/or (iv) reticulation of the ink upon drying.

II. Methods of Manufacture

The disclosed methods include steps described below and illustrated in the FIGS. 1A-1D. Although described as sequential steps for purposes of explanation, this disclosure contemplates that in practice the steps may be performed in any order or simultaneously. As shown in FIGS. 1A-1D, a component of a MEA may be continuously processed using a roll feed and/or roll winder 100, a deposition apparatus 105, and a dryer 110. The roll feed and/or roll winder 100 may be rollers or alternative means of web conveyance. The deposition apparatus 105 may be a slot die or alternative means of thin film coating. The dryer 110 may be a convection oven or alternative means of wet film drying.

Figure 1A:
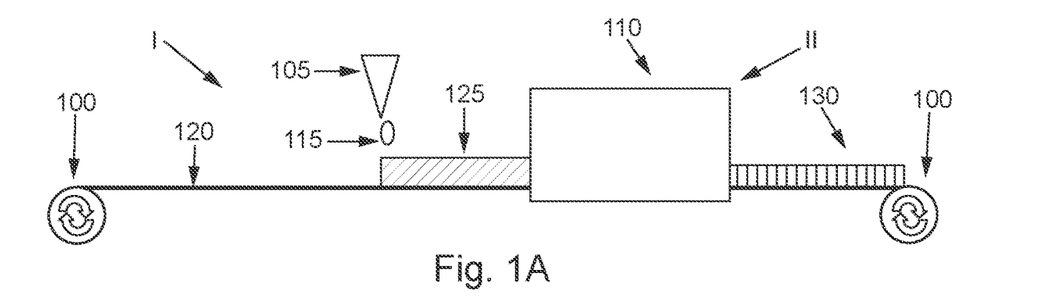
FIGS. 1A-1D show an exemplary flow for a process in accordance with some aspects of the invention.
Figure 1B:
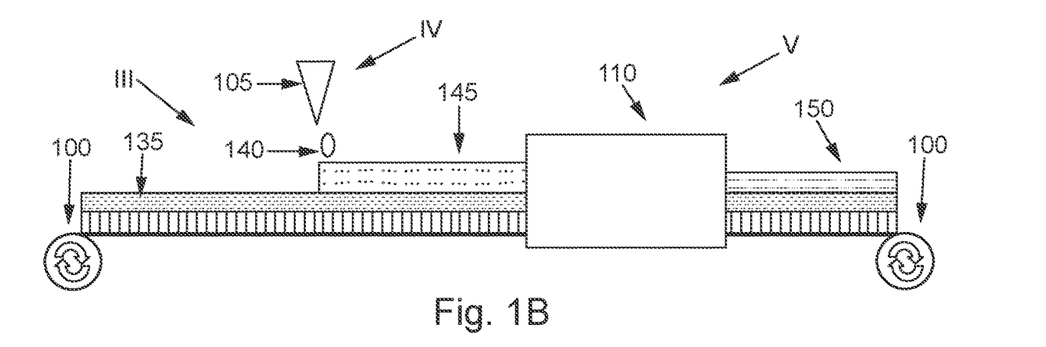
Figure 1C:
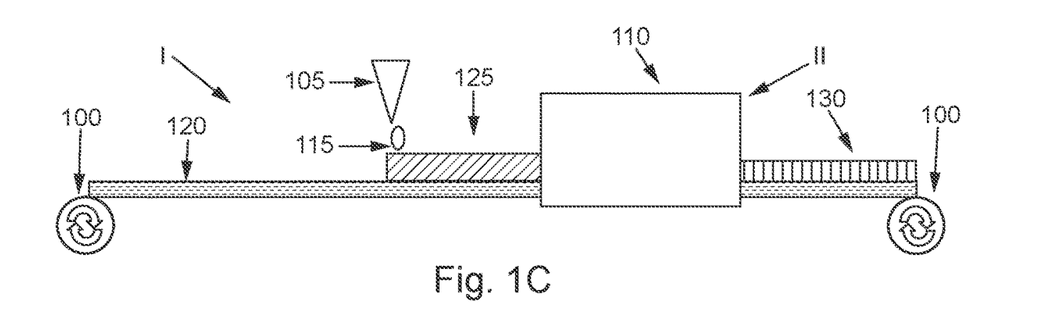

In some embodiments, at step (I) shown in FIGS. 1A and 1C, an aqueous mixture 115 is deposited via the deposition apparatus 105 on a substrate 120 positioned on roll feed and/or roll winder 100. The deposition of the aqueous mixture 115 forms a wet electrode layer 125 directly adjacent (optionally on top of) substrate 120. At step (II) shown in FIGS. 1A and 1C, the wet electrode layer 125 is conveyed via the roll feed and/or roll winder 100 to a dryer 110 and substantially dried, optionally at a temperature greater than ambient temperature (25° C.), e.g., at a temperature greater than 50° C., greater than 75° C., greater than 100° C., greater than 130° C., from 10° C. to 300° C., or from 100° C. to 150° C., optionally at a drying time from 0.01 to 10 minutes, e.g., from 0.1 to 8 minutes, from 0.1 to 5 minutes, from 0.1 to 2 minutes, or from 0.1 to 1 minute. The drying of the wet electrode layer 125 forms a dry electrode 130 on the substrate 120.

As indicated above, solvents in traditional electrode inks, when coated directly on top of a substrate, tend to penetrate, dissolve, and/or otherwise disrupt the substrate, greatly reducing the electrochemical efficiency of the electrode and the integrity of the substrate. Therefore, according to various embodiments, the wet electrode layer 125 is formed using an aqueous mixture 115 of water, a water-insoluble component, a catalyst, and an ionomer, which prevents or minimizes dissolution of the substrate, penetration of the pores of the substrate, a deposition of catalyst too far from the substrate to be fully utilized, and/or reticulation of the ink upon drying, as described herein.

In various embodiments, the aqueous mixture 115 comprises water, a water-insoluble component, a catalyst, and an ionomer. The water may be present in the aqueous mixture 115 in an amount greater than about 35 wt. %, greater than about 50 wt. %, greater than about 70 wt. %, greater than about 80 wt. %, or greater than about 90 wt. %, based on a total weight of the ionomer and vehicle in the aqueous mixture 115. For example, the water may be present in the aqueous mixture 115 in an amount from about 35 wt. % to about 99 wt. %, based on a total weight of the ionomer and vehicle in the aqueous mixture 115. The catalyst may be present in the aqueous mixture 115 in an amount less than about 90 wt %, less than about 35 wt %, or less than about 9 wt. %, based on a total weight of the aqueous mixture 115. For example, the catalyst may be present in the aqueous mixture 115 in an amount from 1 wt. % to 90 wt. %, from 1 wt. % to 42 wt. %, or from 3 wt. % to 30 wt. %, based on a total weight of the aqueous mixture 115. The ionomer may be PFSA, and may be present in the aqueous mixture 115 in an amount less than about 50 wt %, less than about 35 wt %, less than about 8 wt. %, or less than about 0.5 wt. %, based on a total weight of the ionomer and vehicle in the aqueous mixture 115. For example, the ionomer may be present in the aqueous mixture 115 in an amount from 0.5 wt. % to 50 wt. %, based on a total weight of the ionomer and vehicle in the aqueous mixture 115.

There is no particular restriction on a catalyst employed, and any known catalyst can be used. Thus, the nature of the catalyst may vary widely. The catalyst may comprise noble metals, transition metals, or alloys thereof. Specific examples of catalytic materials include platinum, ruthenium, iridium, cobalt, and palladium, and are not limited to elemental metals. For example, the catalyst may also comprise iridium oxide, a platinum-ruthenium alloy, a platinum-iridium alloy, a platinum-cobalt alloy, etc. In some embodiments, the catalyst comprises a core shell catalyst, as described, for example, in US2016/0126560, the entirety of which is incorporated herein by reference. In some embodiments, the catalyst comprises a supported catalyst, which may comprise carbon as the support material. For example, in some embodiments, the catalyst comprises a supported platinum catalyst, such as platinum on carbon black.

In one embodiment, the water-insoluble component is a water-insoluble alcohol. In another embodiment, the water-insoluble component is a water-insoluble carboxylic acid. The water-insoluble component, whether an alcohol or carboxylic acid or both, may be present in the aqueous mixture 115 in an amount less than about 20 wt. %, less than about 15 wt. %, less than about 10 wt. %, less than about 8 wt. %, less than about 6 wt. %, or less than about 4 wt. %, based on a total weight of the ionomer and vehicle in the aqueous mixture 115. For example, the water-insoluble alcohol may be present in the aqueous mixture 115 in an amount from 0.5 wt. % to 20 wt. %, e.g., from 0.5 wt. % to 15 wt. %, from 0.5 wt. % to 10 wt. %, from 1 wt. % to 20 wt. %, from 5 wt. % to 20 wt. %, or from 10 wt. % to 20 wt. %, based on a total weight of the ionomer and vehicle in the aqueous mixture 115. The weight percentages recited herein should be considered as applying to the collective amount of all water-insoluble components for embodiments employing more than one water-insoluble component.

In other embodiments, the aqueous mixture 115 further comprises a water-soluble compound. The water-soluble compound may comprise a water-soluble alcohol or a glycol ether. In some embodiments, the water-soluble alcohol comprises isopropanol, tert-butanol, dipropylene glycol, or combinations thereof. In other embodiments, the glycol ether comprises dipropylene glycol (DPG) or propylene glycol methyl ether (PGME). The water-soluble compound may be present in the aqueous mixture 115 in an amount less than about 50 wt. %, optionally in an amount less than about 25 wt. %, optionally in an amount less than about 9 wt. %, or optionally in an amount less than about 4 wt. %, based on a total weight of the ionomer and vehicle in the aqueous mixture 115.

The substrate 120 shown in FIGS. 1A-1D may comprise a porous layer, a non-porous layer, or a combination thereof. In some embodiments, the porous layer may be air-permeable. The porous layer may comprise a GDL or a porous release layer. The porous release layer may comprises an expanded polymer, for example, in one non-limiting embodiment, an ePTFE polymer having a mass per area of less than about 16 g/m$^2$ (measurements executed in accordance to U.S. Pat. No. 7,306,729 B2), a bubble point of greater than about 70 psi (measurements executed in accordance to U.S. Pat. No. 7,306,729 B2, with device manufactured by Porous Materials, Inc. in Ithaca, NY; hereinafter "PMI"), and a Z-strength sufficient to prevent cohesive failure when the electrode is separated from the air-permeable release layer. The non-porous layer may comprise a non-porous release layer or a PEM. The PEM may comprise an ionomer such as a proton-conducting polymer, or a porous microstructure and an ionomer such as a proton-conducting polymer impregnated in the porous microstructure as described in Bahar et al, U.S. Pat. No. RE 37,307. The porous microstructure may comprise a polymeric fluorocarbon material or a polymeric hydrocarbon material. The fluorocarbon material may comprise an expanded polytetrafluoroethylene (ePTFE) membrane. The hydrocarbon material may comprise polyethylene, polypropylene, or polystyrene. The proton-conducting polymer may comprise PFSA.

At optional step (III) shown in FIG. 1B, in some embodiments, a dry PEM 135 is formed on a side of the dry electrode layer 130 opposite that of the substrate 120. The dry PEM 135 may comprise an ionomer such as a proton-conducting polymer, or a porous microstructure and an ionomer such as a proton-conducting polymer impregnated in the porous microstructure, as described herein. In alternative embodiments, the dry electrode layer 130 may be laminated on the dry PEM 135 such that the dry PEM 135 is attached to the dry electrode 130, optionally on a side opposite that of substrate 120 (if present). In other embodiments, a porous layer, a non-porous layer or combinations thereof may be laminated on the dry electrode layer 130 and/or the substrate 120 (e.g., on a side of the substrate 120 opposite that of the dry electrode 130).

At optional step (IV) shown in FIG. 1B, an aqueous mixture 140 is deposited via the deposition apparatus 105 on a side of the PEM 135 opposite that of dry electrode layer 130. The deposition of the aqueous mixture 140 forms a wet electrode layer 145 on top of the PEM 135. The aqueous mixture 140 may be the aqueous mixture as described herein accordance with some embodiments (e.g., including water, a water-insoluble component, a catalyst, and an ionomer), or the mixture as described herein in accordance with traditional processes (e.g., ethanol and/or other vehicle, a catalyst, and an ionomer). At optional step (V), the wet electrode layer 145 is conveyed via the roll feed and/or roll winder 100 to a dryer 110 and substantially dried. The drying of the wet electrode layer 145 optionally occurs at the temperature indicated above forms a dry electrode layer 150 on top of the PEM 135, the dry electrode 130, and the substrate 120. At optional step (VI) (not shown), a dry substrate 155 is formed or laminated on top of the dry electrode layer 150. The dry substrate 155 may be a gas diffusion layer, a porous release layer, or a non-porous release layer.

In accordance with other aspects, FIG. 1C shows at step (I), an aqueous mixture 115 is deposited via the deposition apparatus 105 on a substrate 120 positioned on roll feed and/or roll winder 100. The deposition of the aqueous mixture 115 forms a wet electrode layer 125 on top of the substrate 120. The substrate 120 may be a PEM, as described herein. At step (II), the wet electrode layer 125 is conveyed via the roll feed and/or roll winder 100 to a dryer 110 and substantially dried. The drying of the wet electrode layer 125 forms a dry electrode layer 130 on top of the substrate 120.

Figure 1D:
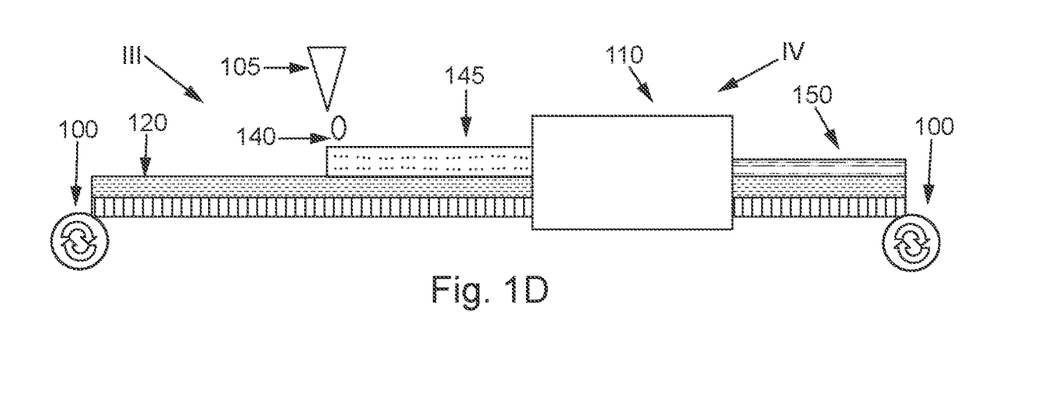

At optional step (III) shown in FIG. 1D, in some embodiments, the dry electrode layer 130 and the substrate 120 are flipped such that the substrate 120 is on top of the dry electrode layer 130, and an aqueous mixture 140 is deposited via the deposition apparatus 105 on a side of the substrate 120 opposite that of the dry electrode 130. The deposition of the aqueous mixture 140 forms a wet electrode layer 145 on top of the substrate 120. The aqueous mixture 140 may be the aqueous mixture as described herein accordance with some embodiments (e.g., including water, a water-insoluble component, a catalyst, and an ionomer), or the mixture as described herein in accordance with traditional processes (e.g., ethanol and/or other vehicle, a catalyst, and an ionomer). In alternative embodiments, a dry electrode layer 150 may be laminated on the substrate 120 such that dry electrode layer 150 is attached to the substrate 120 on a side opposite that of the dry electrode layer 130. In other embodiments, a porous layer, a non-porous layer or combinations thereof may be laminated on the dry electrode layer 130 and/or the substrate 120 (e.g., on a side of the substrate 120 opposite that of the dry electrode 130). At optional step (IV), the wet electrode layer 145 is conveyed via the roll feed and/or roll winder 100 to a dryer 110 and substantially dried. The drying of the wet electrode layer 145 forms a dry electrode layer 150 on top of the substrate 120 and the dry electrode layer 130.

Although FIGS. 1A and 1C show that an aqueous mixture 115 is deposited via the deposition apparatus 105 on a substrate 120, it should be understood that the substrate may not be alone and instead may already be formed as part of a component of an MEA that includes a porous layer, a non-porous layer, or combinations thereof. For example, the substrate may be provided already formed with a dry electrode layer (e.g., formed as described herein in accordance with some embodiments (e.g., using an aqueous mixture including water, a water-insoluble component, a catalyst, and an ionomer), or the mixture as described herein in accordance with traditional processes (e.g., ethanol and/or other vehicle, a catalyst, and an ionomer)), a gas diffusion layer, porous release layer, a PEM, and/or a non-porous release layer attached on one side of the substrate.

Figure 2A:
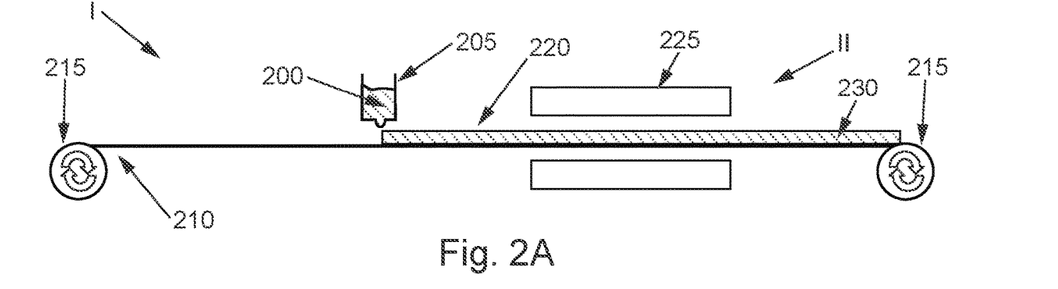
FIGS. 2A-2D show an exemplary flow for a process in accordance with some aspects of the invention.

FIGS. 2A-2D show a continuous process for producing a component of an MEA in accordance with one embodiment. FIG. 2A shows at step (I), an aqueous mixture 200 is deposited via a deposition apparatus 205 on a substrate 210 positioned on roll feed and/or roll winder 215. The deposition of the aqueous mixture 200 forms a wet electrode layer 220 on top of the substrate 210. The substrate 210 may be a gas diffusion layer, a porous release layer, a PEM, or a non-porous release layer. For example, the substrate 120 may be a low-cost ePTFE base backer or release layer. At step (II), the wet electrode layer 220 is conveyed via the roll feed and/or roll winder 215 to a dryer 225 and substantially dried. The drying of the wet electrode layer 220 forms a dry electrode layer 230 on top of the substrate 210.

Figure 2B:
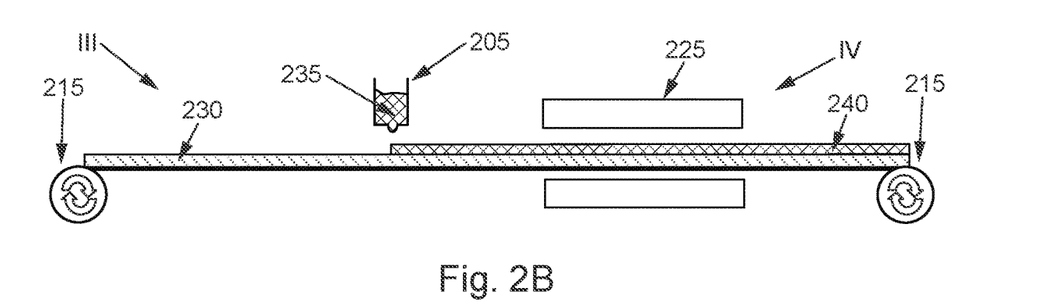

At optional step (III) shown in FIG. 2B, an aqueous wet mixture 235 comprising an aqueous ionomer mixture is deposited via the deposition apparatus 205 on a side of the dry electrode layer 230 opposite that of the substrate 210. The aqueous ionomer mixture may comprise a PFSA ionomer such as Nafion® (DuPont) and a water-insoluble component, i.e., water-insoluble alcohol or carboxylic acid. At step (IV), the aqueous wet layer 235 is conveyed via the roll feed and/or roll winder 215 to a dryer 225 and substantially dried. The drying of the aqueous wet layer 235 forms a protective ionomer layer 240 on top of the dry electrode layer 230.

Figure 2C:
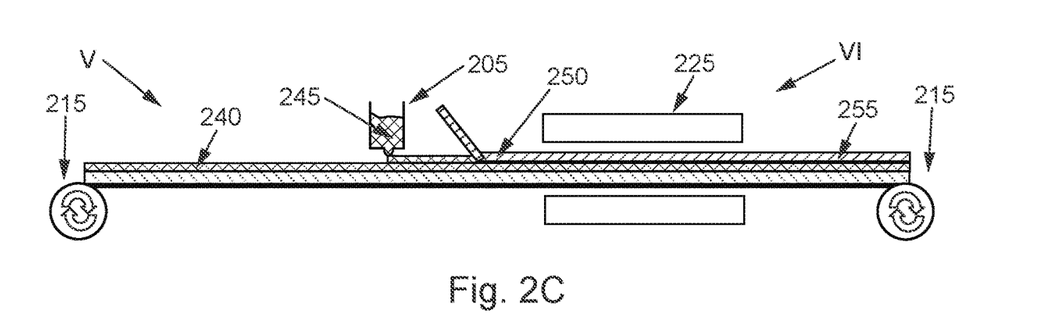

At optional step (V) shown in FIG. 2C, a wet (liquid phase) ionomer mixture or composite wet mixture 245 is deposited via the deposition apparatus 205 on a side of the protective ionomer layer 240 opposite that of the dry electrode layer 230. The deposition of the wet ionomer mixture or composite wet mixture 245 forms a wet ionomer layer or composite wet layer 250 on top of the protective ionomer layer 240. In some embodiments, the wet ionomer mixture 245 may be an ionomer mixture such as a proton-conducting polymer (e.g., an unreinforced ionomer mixture). In alternative embodiments, in the composite wet mixture 245, an ionomer mixture substantially impregnates a microporous ePTFE to render an interior volume of the ePTFE substantially occlusive, as described in Bahar et al, U.S. Pat. No. RE 37,307, thereby forming the composite wet layer 250 (e.g., a reinforced ionomer mixture). At step (VI), the wet ionomer layer or composite wet layer 250 is conveyed via the roll feed and/or roll winder 215 to a dryer 225 and substantially dried. The drying of the wet ionomer layer or composite wet layer 250 forms a dried ionomer layer or dried composite layer 255 (i.e., a PEM) on top of the protective ionomer layer 240.

Figure 2D:
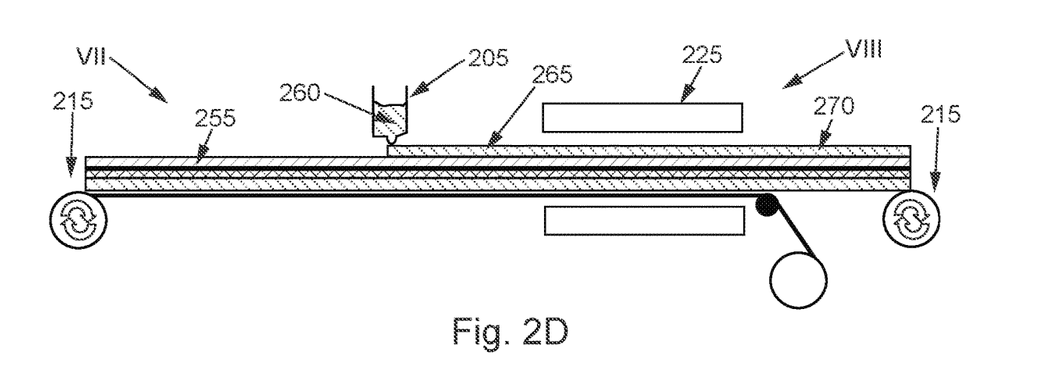

At optional step (VII) shown in FIG. 2D, an aqueous mixture 260 is deposited via the deposition apparatus 205 on a side of the dried ionomer layer or dried composite layer 255 opposite that of the protective ionomer layer 240. The deposition of the aqueous mixture 260 forms a wet electrode layer 265 on top of the dried ionomer layer or dried composite layer 255. The aqueous mixture 260 may be an aqueous mixture as described herein in accordance with some embodiments (e.g., including water, a water-insoluble component, a catalyst, and an ionomer), or the mixture as described herein in accordance with traditional processes (e.g., ethanol and/or other vehicle, a catalyst, and an ionomer). At optional step (VII), the wet electrode layer 265 is conveyed via the roll feed and/or roll winder 215 to a dryer 225 and substantially dried. The drying of the wet electrode layer 265 forms a dry electrode layer 270 on top of the dried ionomer layer or dried composite layer 255, the protective ionomer layer 240, the dry electrode layer 230, and the substrate 210. In alternative embodiments, another protective ionomer layer may be formed between the wet electrode layer 265 and the dry electrode layer 270 in accordance with similar processes as described herein with respect to the protective ionomer layer 240.

The present disclosure will be better understood in view of the following non-limiting examples. The ePTFE membrane was produced for the examples, unless otherwise indicated, in accordance with U.S. Pat. No. 3,953,566, the entirety of which is incorporated herein by reference, and had a mass-per-area of 7.6 g/m$^2$ and a mean flow pore size of about 0.25 microns.

Comparative Example 1

An aqueous ink was prepared containing 10.5 wt. % catalyst, 8.1 wt. % PFSA ionomer, and 81.4 wt % deionized water. The catalyst was a 50 wt. % platinum supported on carbon black. The ionomer had an equivalent weight of 810 g/eq. The ink was sonicated using a Misonix 3000 ultrasonic horn for 5 minutes, at which time the ink appeared uniform and well dispersed. The viscosity of the ink was low (water-like). For the coating substrate, a porous release layer was prepared by restraining an ePTFE membrane in an embroidery hoop. Several drops of the ink were placed onto the surface of the ePTFE membrane using a disposable pipet, and spread using the bulb of the pipet. Rather than form a uniform wet layer, the ink quickly reticulated into droplets.

Examples 2A-2C (1-Hexanol as Water-Insoluble Component)

In Example 2A, 0.065 grams of 1-hexanol was added to 5.0 grams of the aqueous ink described in the Example 1. This mixture was then shaken to emulsify the 1-hexanol. The viscosity remained low (water-like). Several drops of the mixture were placed onto the ePTFE substrate described in the comparative Example 1 using a disposable pipet, and spread using the bulb of the pipet. The mixture formed a uniform wet layer that did not significantly reticulate when dried with a heat gun to produce an electrode. None of the mixture was observed on the reverse (uncoated) side of the substrate, indicating that it did not imbibe the substrate. The total amount of 1-hexanol in the mixture was 1.3 wt. % based on the total mass of the mixture, or 1.4 wt. % based on the mass of the ionomer and solvents.

In Example 2B, more 1-hexanol was then added to the mixture, resulting in a 1-hexanol concentration of 5.8 wt. % based on the mass of the ionomer and solvents. The mixture was shaken, coated, and dried as before and the same results were observed.

In Example 2C, more 1-hexanol was then added to the mixture from Example 2B, resulting in a 1-hexanol concentration of 10.4 wt. % based on the mass of the ionomer and solvents. The mixture was shaken as in the previous examples. The viscosity of the mixture increased dramatically, such that the mixture became a thick paste. The paste could still be coated and dried on the substrate as before, and the same results were observed.

Example 3 (1-Decanol as Water-Insoluble Component)

In Example 3, 0.073 grams of 1-decanol was added to 5.0 grams of the aqueous ink described in comparative Example 1. This mixture was then shaken. The viscosity remained low (water-like). Using a disposable pipet, several drops of the mixture were placed onto the ePTFE substrate described in comparative Example 1, and then spread using the bulb of the pipet. Some tendency for phase separation prior to depositing was observed, but agitation and immediate coating and drying resulted in a uniform coating. The wet layer did not significantly reticulate when dried with a heat gun to produce an electrode. None of the mixture was observed on the reverse (uncoated) side of the substrate, indicating that it did not imbibe the substrate. The total amount of 1-decanol in the mixture was 1.6 wt % based on the total mass of the ionomer and vehicle.

Examples 4A-4B (1-Pentanol as Water-Insoluble Component)

In Example 4A, 0.057 grams of 1-pentanol was added to 5.1 grams of the aqueous ink described in comparative Example 1. This mixture was then shaken. The viscosity remained low (water-like). Using a disposable pipet, several drops of the mixture were placed onto the ePTFE substrate described in comparative Example 1, and then spread using the bulb of the pipet. The mixture formed a uniform wet layer that did not significantly reticulate when dried with a heat gun to produce an electrode. None of the mixture was observed on the reverse (uncoated) side of the substrate, indicating that it did not imbibe the substrate. The total amount of 1-pentanol in the mixture was 1.2 wt % based on the total mass of the ionomer and vehicle.

In Example 4B, more 1-pentanol was then added to the mixture of Example 4A, resulting in a 1-pentanol concentration of 1.6 wt % based on the total mass of the ionomer and vehicle. The mixture was shaken, coated, and dried as before and the same results were observed.

Examples 5A-5F (n-Hexanoic Acid as Water-Insoluble Component)

In Example 5A, 0.040 grams of n-hexanoic acid was added to 5.0 grams of the aqueous ink described in Example 1. This mixture was then shaken to emulsify the n-hexanoic acid. The viscosity remained low (water-like). Several drops of the mixture were placed onto the ePTFE substrate described in comparative Example 1 using a disposable pipet, and spread using the bulb of the pipet. The mixture formed a uniform wet layer that did not significantly reticulate when dried with a heat gun to produce an electrode. None of the mixture was observed on the reverse (uncoated) side of the substrate, indicating that it did not imbibe the substrate. The total amount of n-hexanoic acid in the mixture was 0.8 wt. % based on the total mass of the mixture, or 0.9 wt. % based on the mass of the ionomer and solvents.

In Examples 5B-5D, more n-hexanoic acid was then added to the mixture from Example 5A in increments, resulting in n-hexanoic acid concentrations of 1.3 wt % (Example 5B), 5.8 wt % (Example 5C), and 10.4 wt % (Example 5D) based on the mass of the ionomer and solvents. In each case, the mixture was shaken, coated, and dried as before and the same results were observed. The mixtures were also allowed to puddle on the substrate and dry slowly at room temperature, and no penetration of the substrate was observed. In each case mixtures could still be coated and dried on the substrate as before, and the same results were observed.

In Examples 5E and 5F, more n-hexanoic acid was added to the mixture of Example 5D in increments, resulting in a n-hexanoic acid concentrations of 14.6 wt % (Example 5E) and 18.4 wt % (Example 5F), based on the mass of the ionomer and solvents. In each case the mixture was shaken as before, and the viscosity increased significantly, such that the mixture became a thin paste at 18.4 wt %. In each case the higher-viscosity mixtures could still be coated and dried on the substrate as before, and the same results were observed. The mixtures were also allowed to puddle on the substrate and dry slowly at room temperature, and in Example 5F, some penetration of the substrate was observed.

Example 6 (n-Nonanoic Acid as Water-Insoluble Component)

In Example 6, 0.067 grams of n-nonanoic acid was added to 5.0 grams of the aqueous ink described in comparative Example 1. This mixture was then shaken. The viscosity remained low (water-like). Using a disposable pipet, several drops of the mixture were placed onto the ePTFE substrate described in comparative Example 1, and then spread using the bulb of the pipet. Some tendency for phase separation was observed prior to depositing, but agitation and immediate coating and drying resulted in a uniform coating. The wet layer did not significantly reticulate when dried with a heat gun to produce an electrode. None of the mixture was observed on the reverse (uncoated) side of the substrate, indicating that it did not imbibe the substrate. The total amount of n-nonanoic acid in the mixture was 1.5 wt % based on the total mass of the ionomer and vehicle.

Example 7 (n-Hexanoic Acid as Water Insoluble Component)

In Example 7, 0.097 grams of n-hexanoic acid, 2.344 grams of water, and 2.444 grams of an aqueous ionomer solution (14.86 wt % solids) were added to 0.490 grams of the aqueous ink described in comparative Example 1. The ionomer in the solution was the same as that used in the aqueous ink. This mixture was then shaken. The viscosity remained low (water-like). Using a disposable pipet, several drops of the mixture were placed onto the ePTFE substrate described in comparative Example 1, and then spread using the bulb of the pipet. The mixture formed a uniform wet layer that did not significantly reticulate when dried with a heat gun to produce an electrode. None of the mixture was observed on the reverse (uncoated) side of the substrate, indicating that it did not imbibe the substrate. The total amount of n-hexanoic in the mixture was 1.8 wt % based on the total mass of the ionomer and vehicle. The total amount of catalyst in the mixture was 0.9 wt % based on the total mass of the mixture.

Comparative Examples 8A-8B (Ethanol as Water Soluble Component)

In Example 8A, 0.051 grams of ethanol was added to 5.0 grams of the aqueous ink described in the comparative Example 1. This mixture was then shaken. The viscosity remained low (water-like). Using a disposable pipet, several drops of the mixture were placed onto the ePTFE substrate described in comparative Example 1, and then spread using the bulb of the pipet. Rather than form a uniform wet layer, the ink quickly reticulated into droplets. The total amount of ethanol in the mixture was 1.1 wt % based on the total mass of the ionomer and vehicle. In Example 8B, more ethanol was added to the mixture, resulting in an ethanol concentration of 5.5 wt % based on the total mass of the ionomer and vehicle. The mixture was shaken, coated, and dried as before and the same results were observed.

Example 9 (n-Hexanoic Acid as Water-Insoluble Component with Ethanol as Water Soluble Component)

In Example 9, 0.389 grams of n-hexanoic acid was added to the mixture described in comparative Example 8B. This mixture was then shaken. The viscosity remained low (water-like). Using a disposable pipet, several drops of the mixture were placed onto the ePTFE substrate described in comparative Example 1, and then spread using the bulb of the pipet. The wet layer did not significantly reticulate when dried with a heat gun to produce an electrode. None of the mixture was observed on the reverse (uncoated) side of the substrate, indicating that it did not imbibe the substrate. The total amount of n-hexanoic acid in the mixture was 6.9 wt % based on the total mass of the ionomer and vehicle. The total amount of ethanol in the mixture was 4.6 wt % based on the total mass of the ionomer and vehicle.

Examples 10A-10D (Substrate Variation)

In Example 10A, an aqueous mixture of about 70 wt. % water, about 9 wt. % catalyst (50 wt. % Pt on carbon black), about 7 wt. % PFSA ionomer, about 6 wt. % 2-ethyl-1-hexanol, about 4 wt. % tert-butanol, and about 4 wt. % dipropylene glycol was coated with a draw down bar and substantially dried at an oven temperature of 140° C. for 3 minutes to form an electrode layer on top of a GDL (CARBEL® Gas Diffusion Layer CNW10A from W. L. Gore & Associates, Inc.) without substantial penetration of the substrate.

Examples 10B-10D were conducted like Example 10A, but coating the ink onto 3 other substrates, specifically CARBEL® Gas Diffusion Layer CNW20B (from W. L. Gore & Associates, Inc.) for Example 10B, GORE-SELECT® Membrane M735 (W. L. Gore & Associates, Inc.) for Example 10C, and an ePTFE release layer (in accordance with US2016/0233532, the entirety of which is incorporated herein by reference) for Example 10D.

A beginning-of-life polarization measurement indicated that an MEA made with the electrode layer coated on the substrates as described in the aforementioned Examples 10A-10D (i.e., including a water-insoluble component) had fuel cell performance comparable to commercial PRIMEA® Membrane Electrode Assemblies (W. L. Gore & Associates, Inc.).

Example 11A-11C (n-Pentanoic Acid as Water Insoluble Component)

In Example 11A, 0.020 grams of n-pentanoic acid was added to 5.1 grams of the aqueous ink described in the comparative Example 1. This mixture was then shaken. The viscosity remained low (water-like). Using a disposable pipet, several drops of the mixture were placed onto the ePTFE substrate described in comparative Example 1, and then spread using the bulb of the pipet. Rather than form a uniform wet layer, the ink quickly reticulated into droplets, although it is contemplated that the mixture may not reticulate on substrates with higher surface energy, e.g., GDLs. The total amount of n-pentanoic acid in the mixture was 0.4 wt % based on the total mass of the ionomer and vehicle.

In Example 11B, 0.037 grams of n-pentanoic acid was added to the mixture described in Example 11A. This mixture was then shaken. The viscosity remained low (water-like). Using a disposable pipet, several drops of the mixture were placed onto the ePTFE substrate described in comparative Example 1, and then spread using the bulb of the pipet. The wet layer did not significantly reticulate when dried with a heat gun to produce an electrode. None of the mixture was observed on the reverse (uncoated) side of the substrate, indicating that it did not imbibe the substrate. The total amount of n-pentanoic acid in the mixture was 5.3 wt % based on the total mass of the ionomer and vehicle.

In Example 11C, more n-pentanoic acid was then added to the mixture, such that the total amount of n-pentanoic acid in the mixture was 8.6 wt % based on the total mass of the ionomer and vehicle. The mixture was shaken, coated, and dried as before and the same results as Example 11B were observed.

Example 12 (PtRu Black Catalyst at High Loading)

In Example 12, 6.9 grams of an aqueous ink was prepared containing 43.7 wt % catalyst, 7.3 wt % PFSA ionomer, and 49.0 wt % deionized water. The catalyst was PtRu Black (Alfa Aesar Stock #41171). The ionomer had an equivalent weight of 905 g/eq. The ink was sonicated using a Misonix 3000 ultrasonic horn for 30 seconds, at which time the ink appeared uniform and well-dispersed. The viscosity of the ink was low (water-like). Then, 0.20 grams of n-hexanoic acid was added to the aqueous ink, and the mixture was shaken. The viscosity remained low (water-like). Using a disposable pipet, several drops of the mixture were placed onto the ePTFE substrate described in comparative Example 1, and then spread using the bulb of the pipet. The mixture formed a uniform wet layer that did not significantly reticulate when dried with a heat gun to produce an electrode. None of the mixture was observed on the reverse (uncoated) side of the substrate, indicating that it did not imbibe the substrate. The total amount of n-hexanoic acid in the mixture was 5.0 wt % based on the total mass of the ionomer and vehicle. The total amount of catalyst in the mixture was 42.4 wt % based on the total mass of the mixture.

Example 13 (Supported $Pt_3CoNi$ Catalyst)

In Example 13, 4.2 grams of an aqueous ink was prepared containing 9.7 wt % catalyst, 4.4 wt % PFSA ionomer, and 85.9 wt % deionized water. The catalyst was 30 wt % $Pt_3CoNi$ supported on carbon black. The ionomer had an equivalent weight of 720 g/eq. The ink was sonicated using a Misonix 3000 ultrasonic horn for 30 seconds, at which time the ink appeared uniform and well-dispersed. The viscosity of the ink was low (water-like). Then 0.58 grams of n-hexanoic acid was added to the aqueous ink, and the mixture was shaken. The viscosity remained low (water-like). Using a disposable pipet, several drops of the mixture were placed onto the ePTFE substrate described in comparative Example 1, and then spread using the bulb of the pipet. The mixture formed a uniform wet layer that did not significantly reticulate when dried with a heat gun to produce an electrode. None of the mixture was observed on the reverse (uncoated) side of the substrate, indicating that it did not imbibe the substrate. The total amount of n-hexanoic acid in the mixture was 13.2 wt % based on the total mass of the ionomer and vehicle. The total amount of catalyst in the mixture was 8.5 wt % based on the total mass of the mixture.

Comparative Example 14 (Porous Polyethylene Substrate)

In Comparative Example 14, several drops of the ink described in Example 1 were placed onto a porous polyethylene substrate using a disposable pipet, and spread using the bulb of the pipet. The polyethylene substrate was a porous battery separator commercially available from Gelon LIB Group (China) with a thickness of 16 microns, a width of 300 mm, and a mass-per-area of 8.1 grams per square meter. Rather than form a uniform wet layer, the ink quickly reticulated into droplets.

Example 15 (Porous Polyethylene Substrate)

In Example 15, 0.065 grams of 1-hexanol was added to 5.0 grams of the aqueous ink described in the Example 1. This mixture was then shaken to emulsify the 1-hexanol. The viscosity remained low (water-like). Several drops of the mixture were placed onto a porous polyethylene substrate using a disposable pipet, and spread using the bulb of the pipet. The polyethylene substrate was the same substrate described in Comparative Example 14. The mixture formed a uniform wet layer that did not significantly reticulate when dried with a heat gun to produce an electrode. None of the mixture was observed on the reverse (uncoated) side of the substrate, indicating that it did not imbibe the substrate. The total amount of 1-hexanol in the mixture was 1.3 wt. % based on the total mass of the mixture, or 1.4 wt. % based on the mass of the ionomer and solvents.

While the invention has been described in detail, modifications within the spirit and scope of the invention will be readily apparent to the skilled artisan. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

We claim:

1. A method of making a fuel cell component, the method comprising:
   providing a substrate; and
   forming an electrode on the substrate, wherein the forming includes depositing an aqueous mixture comprising water, wherein the water is present in an amount greater than 35 wt. % based on a total weight of the ionomer and a liquid portion of the aqueous mixture, a water-insoluble component comprising a C5-C10 carboxylic acid, a catalyst, and an ionomer, wherein the water-insoluble component comprises a water-insoluble alcohol, water-insoluble carboxylic acid, or a combination thereof, and wherein the water-insoluble component is present in the aqueous mixture in an amount of from 1 wt. % to less than 20 wt. %.

2. The method of claim 1, wherein the substrate comprises a porous layer, a non-porous layer, or a combination thereof; and wherein the water-insoluble component comprises a $C_5$-$C_{10}$ alcohol, a $C_5$-$C_{10}$ carboxylic acid, or a combination thereof; or
   wherein the method further comprises laminating a porous layer, a non-porous layer, or a combination thereof to at least one of the electrode and the substrate.

3. The method as in claim 1, wherein the aqueous mixture comprises a single phase during the depositing step; or
   wherein the aqueous mixture has a low reticulation.

4. The method of claim 1, wherein the forming the electrode further comprises drying the aqueous mixture.

5. The method as in claim 1, wherein the substrate comprises another electrode on a side of the substrate opposite to the electrode.

6. The method as in claim 1, further comprising forming another electrode on a side of the substrate opposite the electrode.

7. The method of claim 6, wherein the forming of the another electrode comprises depositing the aqueous mixture on the substrate.

8. The method of claim 5, wherein the forming of the another electrode further comprises drying the aqueous mixture.

9. The method as in claim 1, further comprising laminating the electrode to a polymer electrolyte membrane.

10. The method as in claim 1, further comprising forming a polymer electrolyte membrane on the electrode.

11. The method as in claim 1, wherein the electrode is a first electrode and the substrate is a polymer electrolyte membrane, such that the step forming an electrode on the substrate comprises forming the first electrode on the polymer electrolyte membrane, wherein the forming comprises depositing an aqueous mixture on the polymer electrolyte membrane, wherein the aqueous mixture comprises water, a water-insoluble component, a catalyst, and an ionomer, wherein the water-insoluble component comprises a water-insoluble alcohol, water-insoluble carboxylic acid, or a combination thereof; and
   the method further comprises forming or adhering a second electrode on the polymer electrolyte membrane.

12. The method of as in claim 1, wherein the electrode is a first electrode and the substrate is a gas diffusion layer, such that the step of forming an electrode on the substrate comprises forming the first electrode on the gas diffusion layer, wherein the forming comprises depositing an aqueous mixture on the gas diffusion layer, and the aqueous mixture comprises water, a water-insoluble component, a catalyst, and an ionomer, wherein the water-insoluble component comprises a water-insoluble alcohol, a water-insoluble carboxylic acid, or a combination thereof; and
   the method further comprises the steps of forming or adhering a polymer electrolyte membrane on the first electrode; and
   forming or adhering a second electrode on the polymer electrolyte membrane.

13. The method of claim 12, wherein the substrate comprises a porous layer.

14. The method of claim 13, wherein the porous layer is air permeable or comprises a gas diffusion layer.

15. The method of claim 13, wherein the porous layer comprises a porous release layer.

16. The method of claim 15, wherein the porous release layer comprising an expanded polymer.

17. The method of claim 16, wherein the expanded polymer comprises expanded polytetrafluoroethylene.

18. The method of claim 12, wherein the substrate comprises a non-porous layer.

19. The method of claim 18, wherein the non-porous layer comprises a non-porous release layer.

20. The method of claim 19, wherein the non-porous layer comprises the polymer electrolyte membrane.

21. The method of claim 12, wherein the polymer electrolyte membrane comprises a proton-conducting polymer.

22. The method of claim 21, wherein the proton-conducting polymer comprises perfluorosulfonic acid.

23. The method of claim 12, wherein the polymer electrolyte membrane comprises a porous microstructure and an ionomer impregnated in the porous microstructure.

24. The method of claim 23, wherein the porous microstructure comprises a perfluorinated porous polymeric material.

25. The method of claim 24, wherein the perfluorinated porous polymeric material comprises expanded polytetrafluoroethylene membrane.

26. The method of claim 23, wherein the porous microstructure comprises a hydrocarbon material.

27. The method of claim 26, wherein hydrocarbon material comprises polyethylene, polypropylene, or polystyrene.

28. The method of claim 23, wherein the ionomer is a proton-conducting polymer.

29. The method of claim 28, wherein the proton-conducting polymer comprises perfluorosulfonic acid.

30. The method of claim 1, wherein the water is present in the aqueous mixture in an amount greater than 35 wt. %, or in an amount greater than 50 wt. %, or in an amount greater than 70 wt. %, or in an amount greater than 80 wt. %, or in an amount greater than 90 wt. %, based on a total weight of the ionomer and vehicle in the aqueous mixture.

31. The method of claim 1, wherein the catalyst comprises a noble metal, a transition metal, or an alloy thereof.

32. The method of claim 1, wherein the catalyst is a supported catalyst.

33. The method of claim 32, wherein the supported catalyst comprises carbon.

34. The method of claim 31, wherein the catalyst is present in the aqueous mixture in an amount less than 90 wt. %, or in an amount less than 35 wt. %, or in an amount less than 9 wt. %, based on a total weight of the aqueous mixture.

35. The method of claim 1, wherein the water-insoluble component comprises a $C_5$-$C_{10}$ alcohol.

36. The method of claim 35, wherein the water-insoluble component comprises 1-pentanol, 1-hexanol, 1-heptanol, 1-octanol, 2-ethyl-1-hexanol, 1-nonanol, 1-decanol, or a combination thereof.

37. The method of claim 1, wherein the water-insoluble component comprises a $C_5$-$C_{10}$ carboxylic acid.

38. The method of claim 37, wherein the water-insoluble component comprises n-pentanoic acid, n-hexanoic acid, n-heptanoic acid, n-octanoic acid, n-nonanoic acid, n-decanoic acid or a combination thereof.

39. The method of claim 1, wherein the water-insoluble component is present in the aqueous mixture in an amount less than 20 wt. %, or in an amount less than 15 wt. %, or in an amount less than 10 wt. %, or in an amount less than 8 wt. %, or in an amount less than 6 wt. %, or in an amount less than 4 wt. %, based on a total weight of the ionomer and vehicle in the aqueous mixture.

40. The method of claim 1, wherein the water-insoluble component is present in the aqueous mixture in an amount of from 1 wt. % to less than 20 wt. % or from 0.5 wt. % to 20 wt. %, or from 0.5 wt. % to 15 wt. %, or from 0.5 wt. % to 10 wt. %, or from 1 wt. % to 20 wt. %, or from 5 wt. % to 20 wt. %, or from 10 wt. % to 20 wt. %, based on a total weight of the ionomer and vehicle in the aqueous mixture.

41. The method of claim 1, wherein the water is present in the aqueous mixture in an amount from 35 wt. % to 99 wt. %, based on a total weight of the ionomer and vehicle in the aqueous mixture.

42. The method of claim 1, wherein the ionomer is present in the aqueous mixture in an amount less than 50 wt. %, or in an amount less than 35 wt. %, or in an amount less than 8 wt. %, or in an amount less than 0.5 wt. %, based on a total weight of the ionomer and vehicle in the aqueous mixture.

43. The method of claim 1, wherein the aqueous mixture further comprises a water-soluble compound.

44. The method of claim 43, wherein the water-soluble compound is present in the aqueous mixture in an amount less than 50 wt. %, or in an amount less than 25 wt. %, or in an amount less than 9 wt. %, or in an amount less than 4 wt. %, based on a total weight of the ionomer and vehicle in the aqueous mixture.

45. The method of claim 43, wherein the water-soluble compound is a water-soluble alcohol or a glycol ether.

46. The method of claim 43, wherein the water-soluble compound is a water-soluble alcohol, and wherein the water-soluble alcohol comprises isopropanol or tert-butanol; or wherein the water-soluble alcohol comprises the glycol ether, and wherein the glycol ether comprises dipropylene glycol or propylene glycol methyl ether.

47. The method as in claim 1, wherein the aqueous mixture is an emulsion.

48. A method of making a fuel cell component, the method comprising:
providing a substrate; and
forming an electrode on the substrate, wherein the forming includes depositing an aqueous mixture comprising water, wherein the water is present in an amount greater than 35 wt. % based on a total weight of the ionomer and a liquid portion of the aqueous mixture, a water-insoluble component comprising a water-insoluble alcohol, a catalyst, and an ionomer, wherein the water-insoluble component comprises a water-insoluble alcohol, water-insoluble carboxylic acid, or a combination thereof, and wherein the water-insoluble component is present in the aqueous mixture in an amount of from 0.5 wt. % to less than 20 wt. %.

* * * * *